United States Patent

Gallego

US005768984A

[11] Patent Number: 5,768,984
[45] Date of Patent: Jun. 23, 1998

[54] PRECISION FISH SEASONING MACHINE

[75] Inventor: Jose Luis Lopez Gallego, Madrid, Spain

[73] Assignee: C.L.G. Inversiones, S.L., Madrid, Spain

[21] Appl. No.: 693,128

[22] PCT Filed: Apr. 17, 1995

[86] PCT No.: PCT/ES95/00041

§ 371 Date: Aug. 13, 1996

§ 102(e) Date: Aug. 13, 1996

[87] PCT Pub. No.: WO96/08975

PCT Pub. Date: Mar. 28, 1996

[30] Foreign Application Priority Data

Dec. 21, 1994 [ES] Spain ........................................ 940265

[51] Int. Cl.$^6$ ........................................................ A23L 1/00
[52] U.S. Cl. ............................... 99/494; 99/486; 118/16; 118/24
[58] Field of Search ............................... 99/494, 485–487, 99/489, 493, 532; 118/13, 16–19, 24, 25, 31; 222/275, 305, 345, 361; 426/289, 292–295, 290

[56] References Cited

U.S. PATENT DOCUMENTS

| 1,664,474 | 4/1928 | Bailey . | |
| 2,346,953 | 4/1944 | Walter | 99/256 |
| 2,865,766 | 12/1958 | Christianson | 99/169 |
| 3,779,205 | 12/1973 | Kuhlman | 118/24 |
| 3,957,556 | 5/1976 | Wilson et al. | 156/87 |
| 4,045,584 | 8/1977 | Jones et al. | 426/289 |
| 4,514,094 | 4/1985 | Buckholz et al. | 99/486 X |
| 4,699,795 | 10/1987 | Thompson | 426/289 |
| 4,808,424 | 2/1989 | Wadell | 426/289 |
| 5,183,507 | 2/1993 | Scherer | 222/275 X |
| 5,575,848 | 11/1996 | Chedville | 99/494 X |

FOREIGN PATENT DOCUMENTS

| 0496693A2 | 7/1992 | European Pat. Off. . |
| 2628941 | 9/1989 | France . |
| 2705869 | 12/1994 | France . |
| 382729 | 11/1932 | United Kingdom . |
| 944278 | 12/1963 | United Kingdom . |

Primary Examiner—Timothy F. Simone
Attorney, Agent, or Firm—Robert M. Schwartz

[57] ABSTRACT

It is made up of a frame upon which travel trays that carry the fish to be seasoned with a given quantity of high salt content product, the system used to distribute this product consisting of a storage tank out of which falls the product upon a distribution hopper through a passage, being arranged inside the hopper a rotating roller with slots for the carriage of the seasoning product, which falls through the lower passage upon the fish arranged on the trays, being the profile of the slots similar to that of the fish that are located below on a tray in correspondence with the position of the slots, being the rotation speed of the driving motor used to actuate the roller determined by the weight of the trays containing the fish.

13 Claims, 3 Drawing Sheets

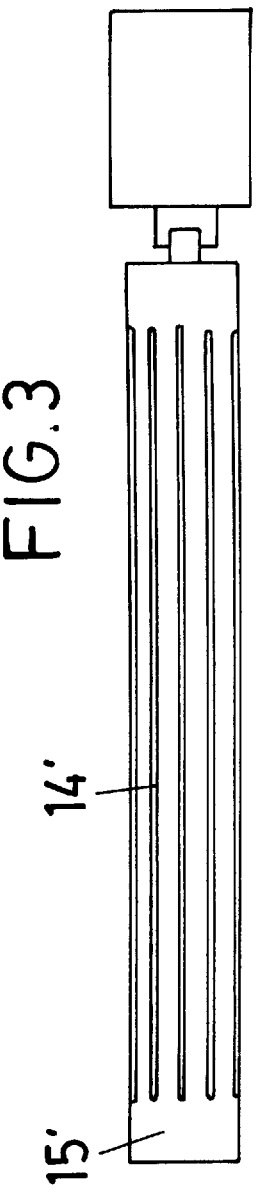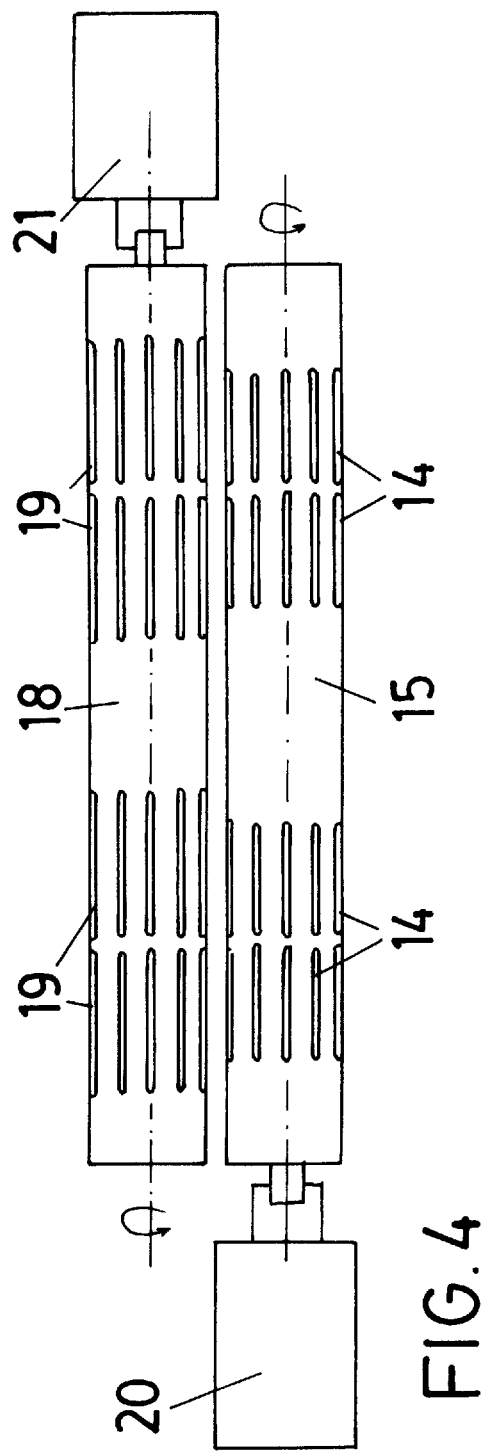

PRECISION FISH SEASONING MACHINE

BACKGROUND OF THE INVENTION

1. Field of The Invention

The object of this invention is a precision machine used to season fish, and which incorporates a control system that enables determining the proper amount of granulated material, with a high salt content, required along the body of the fish as a function of its profile and weight and which actuates the relevant regulation mechanisms applying the proper quantity of the product to each one the sections making up the body of the fish.

The machine is furthermore fitted with a product distribution system acting in such a way that the quantity of product applied upon the various fish sections is determined by the speed of a rotating horizontal roller that has lengthwise slots into which the salt mixture is introduced and from which said mixture is deposited onto the fish being displaced under the roller, and by the curved shapes of the roller slots, which match the profile of the fish.

2. Prior Art

It is already well known in the food preparation industry the salting process applied to foodstuffs in order to preserve the properties of the food items during the period of time between the moment they are processed until they are consumed. The method used is based on the uniform distribution of common salt upon the food item to be treated, being its food preserving character defined by the antiseptic properties of sodium chloride.

This salting procedure is a common practice in the fishing industry, where the fish caught is salted in order to maintain freshness.

The method currently used to season fish consists on the manual application of a coat of a granulated product with a high salt content upon the body of the fish, operation that is performed after the fish has been duly boned and cut in half. The operator then spreads upon the fish, using his/her hands, the product quantity that he/she considers appropriate as a function of the shape and size of the fish to be seasoned.

The proper performance of this operation requires an expert to apply the precise product quantity upon each one of the sections of the body of the fish, being the product quantity to be applied on its upper body different from that to be applied on its tail, as greater product quantities are to be applied on the thicker fish areas.

It is fairly complex to perform this operation manually with the precision required to guarantee optimum fish conservation conditions throughout its body, as the proper performance of this operation depends upon the skills of the operator.

The time employed for the seasoning of each fish varies depending upon the skills and experience of the person carrying out this type of work, being it impossible to guarantee the seasoning of every fish to the precisely required extent as a consequence of the different level of precision with which this operation is performed.

There is no knowledge of the current existence of any type of machine guaranteeing the control of the quantity of salted product required to be applied upon the body of the fish as a function of its body shape and volume.

The optimization of this fish seasoning procedure, by adopting a system that controls the parameters of influence and acts upon the means correspondingly used to regulate the quantity of product to be distributed, makes fully feasible the object of the invention herein proposed.

SUMMARY OF THE INVENTION

This invention tries to solve the previously described problems using a precision fish seasoning machine fundamentally incorporating a displacement track on which slide the trays upon which the fish is placed, a salt distribution system, a tray weighing system and a system used to regulate and control the amount of high salt content product to be applied.

It is a continuous process machine on which the tray is displaced upon the frame using a pull chain, there being several trays placed at different positions along the assembly upon which different operations are performed as a function of the position of the tray along the tray guidance track at any given time.

The application of salt upon the tray is effected using a distribution system upwardly arranged in respect of the tray displacement and guidance track, consisting of a horizontal distribution hopper that includes a rotating internal roller, being the hopper fitted with an upper opening through which it receives the salt that falls in from a storage tank, being the roller fitted with slots into which the salt is introduced, and it is later spread on the tray, upon the rotation of the roller, in the position in which the slots are placed in correspondence with the lower opening of the distribution hopper.

The precision fish seasoning machine incorporates two distribution systems along the frame of the machine, being one of them located at the beginning of the track after the tray entrance area, which function is to provide a minor sprinkling of salt uniformly spread along the whole surface of the tray whenever it passes under the area where the roller is located.

In this case, the roller of this distribution system has a number of slots located on the side of its body and which extend for a distance practically equal to the length of the roller.

Roller movement is caused by the rotation of a driving motor linked to one of its ends, said motor rotates at a constant speed related to the tray displacement velocity, thus achieving a uniform coating of salt, falling through the multiple slots practiced in the roller, over the tray.

Once the tray has been fully covered by this fine salt coating, it then travels through the area where the operators are located, said operators place the fish upon the trays for their later seasoning. The fish are gutted and cut in two halves before they are arranged upon they trays, which are then placed upon the tray areas already prepared for that purpose.

There are two lengthwise projections arranged across the tray and defining three areas, two equally wide areas located at both ends of the tray and a central area twice as wide as the end areas. The projections define the lines along which the fish bodies are placed on both sides of the lines, being the thicker area of each fish the one that defines the fish side in contact with the projection.

Besides the fore mentioned projections, the tray incorporates perimeter projections which purpose is to reinforce the sides of the tray to prevent it from combing.

The proper arrangement of the fish upon the tray is extremely important for the application of the appropriate dose of high salt content granulated product, as it is closely related to the shape of the openings on the rollers of the seasoning mechanism located further down the track.

Once the fish have been duly arranged on the tray, it continues its displacement along the guidance track until it reaches an area where it stops and its weight is then recorded by a weighing scale, said weighing scale being fitted with arms that lift the tray in respect of the displacement track establishing its weight, being the corresponding weight data then forwarded to a control unit.

The tray does then continue travelling, passing under the salt mixture distribution mechanism, essentially made up of the previously described elements: storage tank, distribution hopper and motor driven roller.

In this case the roller has a number of slots distributed upon its side surface which extend lengthwise, having the slots placed on the one line a configuration set in concordance with the shape of the fish and in correspondence with the placement of the tray. This ensures the proper distribution of greater product quantities upon the thicker areas, according to the width of the fish.

The product quantity distributed along, as well as across the body of the fish is defined by the speed of the roller driving motor, being the quantity applied larger at greater motor speeds, given that the roller openings rotate faster and is therefore also greater the number of slots that empty out per time unit upon passing the lower opening of the distribution hopper, from which the seasoning product is deposited onto the fish.

Motor rotation speed changes during the passage of the body of the fish pursuant to its profile, having previously set at the control unit the fish profile type upon which the product is to be deposited.

Another solution would be to incorporate an optical reader previously fitted to the distribution mechanism used to deposit the product upon the fish in order to precisely determine the fish profile sizes, data which are then sent to the control unit, which then acts upon the motor rotation speed regulation means.

Should the fish profile type be visually checked, it shall then be associated to one of the profiles previously stored in the control unit memory, which preset profile would already contain the fish shapes and the range of speeds associated to each of the fish profile sections.

Once speed variation along a given profile has been established, initial rotation speed is then set as a function of the mean weight of each fish, being said mean weight duly defined through the weight of the loaded tray once the weight of the tray itself has been deducted and dividing the figure thus obtained by the number of fish. Thus, the greater the weight of the loaded tray, the greater the weight and volume of the fish thereon, and therefore the quantity of seasoning product to be applied shall be accordingly larger, which implies the application of a faster initial rotation speed.

The granulated product distribution mechanism may incorporate another roller with bigger slots for the application of the product upon larger fish, being the consecutively placed slots separated, as per the prior case, by a distance equal to the size of the tray projection, being the system fitted with the corresponding regulation and control means, and being similarly fitted with a variable speed motor.

The precision fish seasoning machine may optionally incorporate a nested tray feeding system capable of causing the trays to fall upon the frame as per a previously set timing in accordance with the remaining process stages. In these nested tray feeding systems it is particularly important that the trays do not bend easily, as tray combing would considerably difficult the operation of the flat bars normally used to separate the nested trays.

BRIEF DESCRIPTION OF THE DRAWINGS

In order to complement the description being effected and with the aim of aiding towards a better understanding of the features of the invention, this patent specification includes, as an integral part thereof, a set of drawings in which, for purposes merely illustrative but not limitative, the following has been duly represented:

FIG. 3. Represents a view of the internal roller corresponding to the system used to distribute salt over the tray.

FIG. 4. Represents the rollers associated to their respective product distribution system driving motors with two rollers.

DESCRIPTION OF THE PREFERRED EMBODIMENTS

Figure 1:
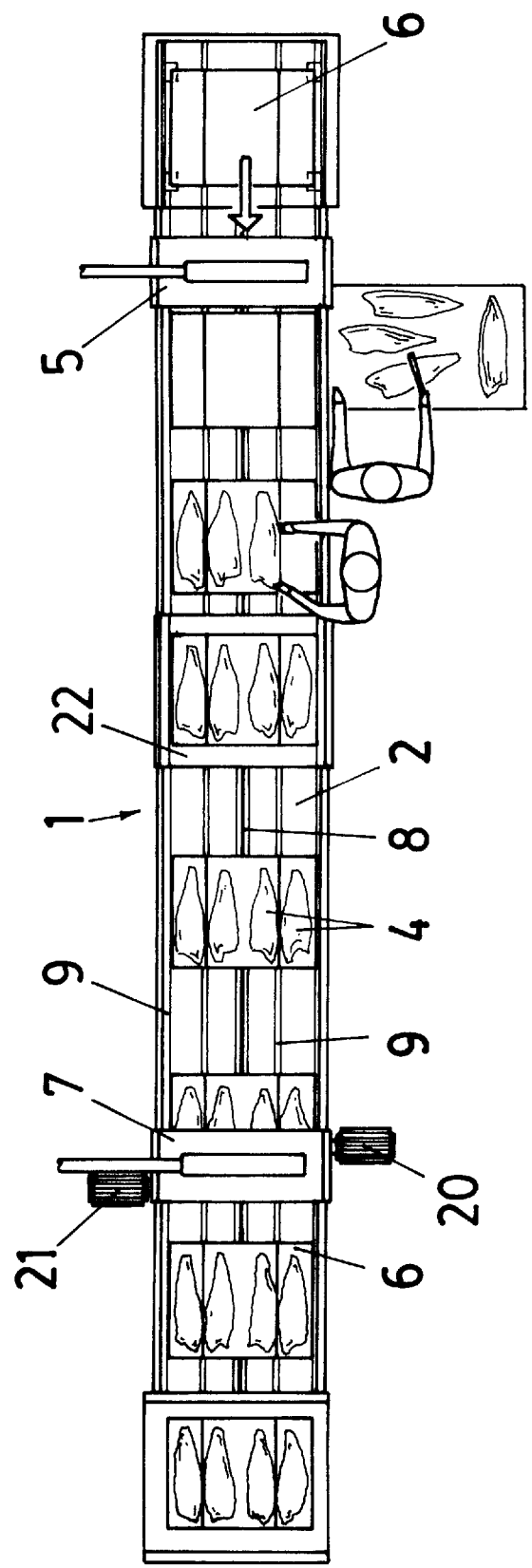
FIG. 1. Represents a plan view of the precision fish seasoning machine.
Figure 2:
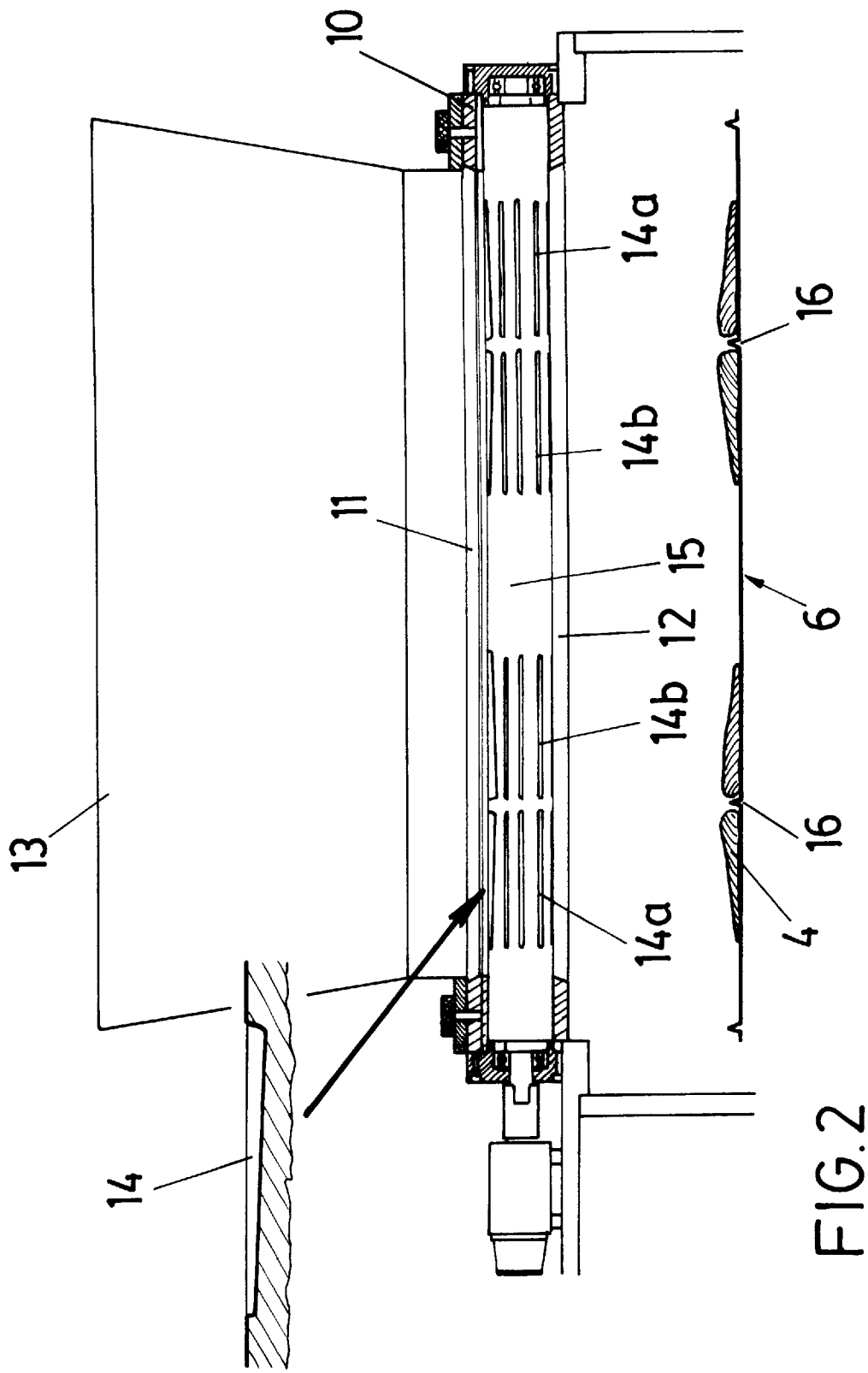
FIG. 2. Represents a view of the high salt content product distribution system with the tray loaded with fish downwardly arranged in correspondence with the openings of the cylinder and a detail view of the slot profile.

Upon inspecting the figures it may be observed how the invention herein described consists of a precision fish seasoning machine basically made up of a frame (1) upwardly conformed by a guidance and conveyance track (2) upon which travel the fish (4) carrying trays (6), a system that distributes (5) salt upon the tray (3), a weighing scale (22) used to weight the trays (6) after the fish (4) has been deposited thereon, a system that distributes (7) the high salt content granulated product over the fish, and a further system used to regulate and control the parameters that influence the quantity or product to be applied on the fish.

The precision seasoning machine may optionally be fitted with a nested tray feeding system arranged at the beginning of the chain, capable of dropping the trays (6) on the guidance track (2) one by one as per previously set time intervals. Should a tray feeding system not be fitted, the trays may also be manually placed on the frame, being said trays then carried along the full length of the guidance and conveyance track (2) by the action of a pulling chain (8).

The displacement of the tray (6) is limited by the side walls of the guidance track (2) and is supported by lengthwise plates (9) made of strong plastic material fixed to the horizontal surface of the guidance track (2), as well as to the side walls of said guidance track.

Once tray motion starts, the tray is guided towards the area where the salt distribution system (5) is located, which is upwardly arranged in respect of the frame, and which function is to deposit a fine coating of salt upon the surface of the tray (6).

The tray (6) keeps travelling upon the guidance track until it reaches the operator that places the fish on the surface of the tray, in such a way that the side corresponding to the thicker fish section remains in contact with the tray projections (16). Said lengthwise projections (6) arranged in pairs across the length of the tray define two equally wide end areas and a central area, so that a fish is arranged on each of the end areas and two fish are placed upon the central area.

Further down the guidance track there is a weighing scale (22) over which the fish carrying tray (3) stops in order for it to be weighed. The corresponding data obtained from the weighing operation of the assembly is then forwarded to the control system.

The tray then keeps moving on the guidance track until it passes under the system (7) used to distribute granulated product upon the fish.

In a fashion similar to that employed by the system (5) used to distribute salt upon the tray, this distribution system (7) is fitted with a horizontally arranged distribution hopper (10) with an upwardly arranged opening (11) through which the product stored in a storage tank (13) falls upon the slots (14) of a roller (15) that rotates inside the distribution hopper (10), being the diameter of the roller (15) slightly smaller than the internal diameter of the distribution hopper (10). On the lower side surface of said hopper there is another opening (12) through which fall the product granules carried by the slots (14) of the roller (15) during their turning movement, and which are directed towards the surface of the tray.

The operational principle of the system (5) used to distributed salt upon the trays and of the system (7) used to distributed the product upon the fish is essentially the same, as both of them are fitted with the elements described in the previous paragraph, with the difference that, in the case of the distribution system (7), the roller has several slots (16) distributed upon the side surface and aligned along it, which number matches the number of fish arranged upon the tray, having slot profiles that substantially match the shape of the fish. In the case of system (5) used to distribute salt upon the tray, the roller (15') has the slots (14') arranged upon the side surface of the roller (15'), but they are lengthwise slots that extend between the ends of the roller and which have the same thickness along their total length.

Taking into consideration that the fish are placed with the thicker end of the fish in contact with the projection (16) of the tray, the profile of the slots (14a) located in correspondence with the fish arranged on the end areas shall be, taking as a reference the end of the roller for each one of the slots (14a), fairly thin at the beginning, and widening progressively until they reach their maximum thickness at approximately ⅗ of the length of the slot, after which their thickness decreases again with a lesser degree of variation all the way up to the opposite end of the slot, which has a thickness of approximately half the maximum thickness reached.

The slots (14b) arranged on the roller (15) in correspondence with the two fish arranged on the central area shall be a mirror image of the end slots (14a) of the roller, being the distance between the edges of consecutive slots approximately half the width of the across projection (16) of the tray.

The possibility of adopting, within the structure of the system (7) used to distribute salt upon the fish, another distribution hopper shaped in a fashion similar to that of the hopper (10) and a roller (18) with slots (19) featuring the same shape and placement as the slots (14) of the roller (15), but longer, so as to apply the product on wider fish, has also been duly foreseen.

In this case, each one of the rollers (15) and (18) shall be respectively fitted with independent driving motors (20) and (21), only one of which shall operate during the process, to be selected by the operator depending upon the size of the fish to be seasoned.

The seasoning machine regulation and control system acts upon the turning speed of the roller driving motor, changing the speed as a function of the profile section and thickness of the fish (4) upon which the product is being distributed. The fish profile to be seasoned is input into the control unit, being the fish arranged on the same tray of a similar profile and weight.

The weight of each fish shall be determined by the mean of the weights of the fish that are placed on the weighing scale together with their carrying tray, being the approximate volume of the fish then defined as a function of their weight, which shall consequently determine the product quantity required by each fish area.

The fish seasoning machine does furthermore incorporate a number of stop and start sensors arranged on the surface of the guidance track, as wells as sensors used to control the amount of salt left inside the storage hoppers.

It is not considered necessary to extend this description any further in order to enable any expert in the art to understand the scope of the invention and the advantages derived therefrom.

The materials, shape, size and arrangement of the elements may be changed as long as any such change does not alter the essential features of the invention.

The terms used to describe this specification must always be interpreted in a wide, and not limitative, sense.

I claim:

1. Precision fish seasoning machine including:
    a frame upwardly conformed by a guidance and conveyance track upon which travel trays that carry the fish, being said trays supported by fairly thin lengthwise plates made of strong plastic material and firmly attached to the horizontal surface and the side surfaces of the guidance track;
    a system used to distribute salt upon the trays located before the section where the fish is placed upon the trays;
    a weighing scale used to weight the trays carrying the fish;
    a system used to distribute the high salt content granulated product over the fish already placed on the tray;
    and a unit that regulates and controls the parameters that influence the quantity of product to be applied on the fish.

2. Precision fish seasoning machine as per claim 1, wherein said system used to distribute salt upon the tray is fitted with
    a storage tank of salt;
    a roller, having lengthwise slots distributed over the side surface, that rotates inside a horizontally arranged distribution hopper, the diameter of the roller being slightly smaller than the internal diameter of the distribution hopper;
    said hopper having an upward opening for the passage of salt from the storage tank, and having on the lower side surface of the hopper another opening through which falls the granulated product carried by the slots of said roller in their turning displacement, and which is directed towards the surface of the tray.

3. Precision fish seasoning machine as per claim 1, wherein the system used to distribute the product upon the fish is fitted with
    a storage tank of salt; a roller, having lengthwise slots distributed over the side surface, that rotates inside a horizontally arranged distribution hopper, the diameter of the roller being slightly smaller than the internal diameter of the distribution hopper;
    said hopper having an upward opening for the passage of salt from the storage tank, and having on the lower side surface of the hopper another opening through which falls the granulated product carried by the slots of said roller in their turning displacement, and which is directed towards the surface of the tray.

4. Precision fish seasoning machine as per claim 2, wherein the slots of the roller of the system used to distribute salt upon the tray extend lengthwise along said tray with a length practically identical to that of the lower opening of the distribution hopper and a uniform slot thickness throughout.

5. Precision fish seasoning machine as per claim 2, wherein the roller of the system used to distribute salt upon the tray is actuated by a driving motor.

6. Precision fish seasoning machine as per claim 3, wherein the slots of the roller of the system used to distribute the product upon the fish are aligned and match in number the number of fish that the tray has been designed to carry.

7. Precision fish seasoning machine as per claim 6, wherein the slots of the roller of the system used to distribute the product upon the fish feature profiles that approximate in shape the profiles of the fish as they are arranged on the tray.

8. Precision fish seasoning machine as per claim 5, wherein the roller of the system used to distribute the product upon the fish is actuated by a variable speed driving motor.

9. Precision fish seasoning machine as per claim 7, wherein the profile of the slots of the roller arranged in correspondence with the fish feature a smaller thickness at one of their ends, which increases progressively until it reaches its maximum thickness at approximately $3/5$ of the length of the slot, which thickness then decreases with a smaller variation all the way up to the opposite end of the slot, at which end it features a thickness of approximately half the maximum slot thickness.

10. Precision fish seasoning machine as per claim 3, wherein the system used to distribute the product upon the fish may be fitted, in parallel to the body of the cylinder, with another similarly sized cylinder containing a roller with slots shaped and placed in a fashion similar to that of the primary roller but with a greater length for their application upon wider fish.

11. Precision fish seasoning machine as per claim 1, wherein the tray has two lengthwise projections arranged crosswise in respect to the longer side of the tray, defining two equally wide end areas on each one of which a fish is placed and a central area twice as wide as the end areas on which two fish are placed, so that the thicker section of each fish is arranged in contact with the lengthwise projection.

12. Precision fish seasoning machine as per claim 1, wherein the regulation and control unit acts upon the turning speed of the driving motor linked to the roller of the system used to distribute granulated product upon the fish, changing the rotation speed as a function of the weight of the tray on the weighing scale and of the fish profile.

13. Precision fish seasoning machine as per claim 1, wherein the regulation and control unit incorporates a number of sensors that stop and start the pulling chain arranged on the guidance track, as well as sensors that control the quantity of product left inside the storage tanks.

* * * * *